Oct. 27, 1970            J. W. RABA            3,536,325

PATTERN BOARD FOR DEVELOPING OCULAR MOTOR COORDINATION

Filed July 2, 1968

INVENTOR.
JOSEPH W. RABA

BY James H. Conway

AGENT 3,536,325
PATTERN BOARD FOR DEVELOPING OCULAR
MOTOR COORDINATION
Joseph W. Raba, 30 Peachtree Lane,
Huntington Station, N.Y. 11746
Filed July 2, 1968, Ser. No. 742,044
Int. Cl. A63b 21/00
U.S. Cl. 272—79         2 Claims

ABSTRACT OF THE DISCLOSURE

A device for assisting young children in developing ocular-motor coordination comprises a flat board having a recessed endless track in which a captive movable member may be slid. A spring biased pawl has been provided on the member to restrict its movement so that it will slide in one direction only in the slot.

---

This invention relates generally to devices that will assist young children in the development of ocular-motor coordination and more particularly in a device that will permit repetitive operation to improve deficiencies in the normal development of visual perception or ocular-motor coordination.

It is an established fact that a certain percentage of young chilldren in the early primary school age group, inherently or otherwise, cannot readily coordinate their visual objective with the reproductions of the visual objective. Particularly in elementary spelling, reproduction of a simple word by the child results in a lack of coordination that indicates what appears to be poor penmanship. In reality, the basic ocular-motor coordination of the child is at fault. When such a determination is made, the present invention will assist the child in overcoming the impairment or developmental lag in his or her early stages of education and correct the problem with a minimum of effort. When no attempt is made to correct this condition in the early years, it becomes more difficult to overcome in the later elementary years.

Briefly, the present invention comprises a board having any one of a plurality of predetermined tracks recessed therein in which a handle is movably secured that is adapted to be grasped by a child and moved through the predetermined patterns.

Accordingly, one of the principal objects of the invention resides in the provision of a board having a track pattern formed therein and including a captive member movable within the track in repetitive manual cycles.

Another object of the invention is to provide variable means to adjustably resist the movement of the captive member in the track patterns.

Still another object is to provide means to facilitate movement of the captive member in a direction compatible with established teaching procedures for children learning to reproduce alphabetical or other basic data.

Other ancillary objects will be in part hereinafter pointed out and will be in part hereinafter apparent.

Figure 1:
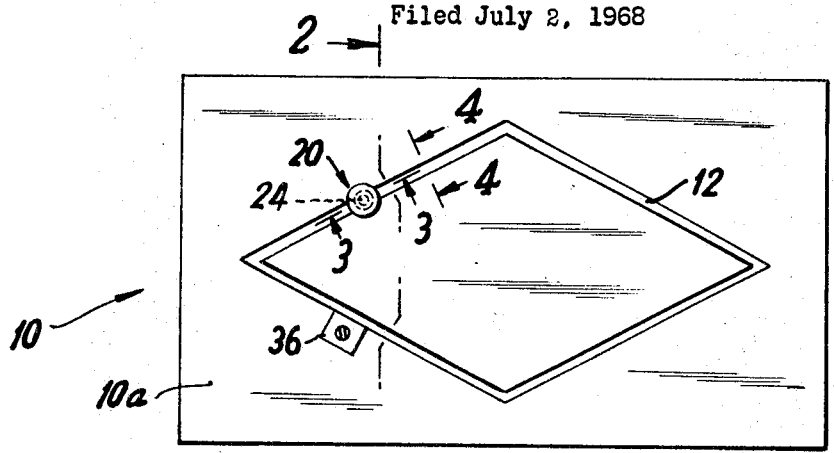
FIG. 1 is a plan elevation of a typical pattern board illustrating the movable member disposed thereon.
Figure 2:
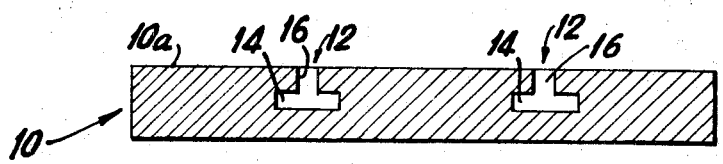
FIG. 2 is a cross section of the board illustrating the recessed T-slots taken along line 2—2 of FIG. 1.

Referring to the drawing in detail, pattern board 10 comprises a rectangular planar member having formed on one surface a recessed captive inverted T-slot 12. Slot 12 is disposed in a continuous endless configuration having a predetermined shape for a purpose hereinafter appearing. Slot 12, FIG. 2, is formed in an inverted T-shape to provide an enlarged tunnel portion 14 and a throat portion 16 that communicates with the upper surface 10a of board 10.

Figure 3:
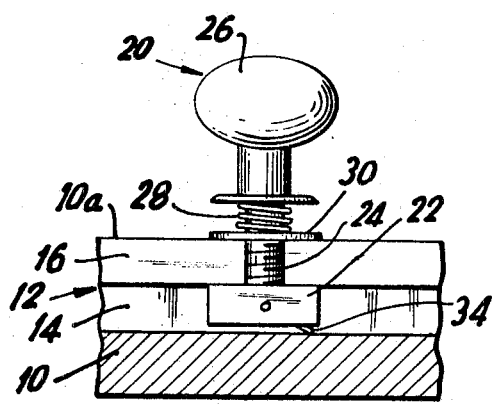
FIG. 3 is a cross section taken along line 3—3 of FIG. 1.
Figure 4:
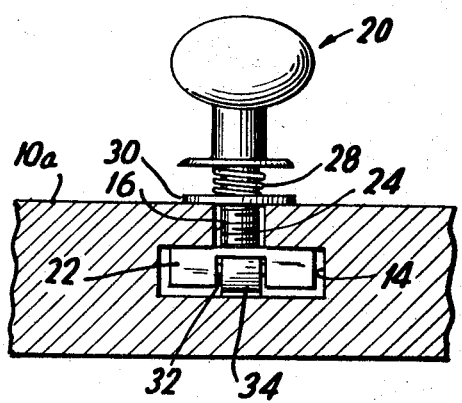
FIG. 4 is an enlarged detail taken along line 4—4 of FIG. 1 in cross-section.

As shown in FIGS. 3 and 4, a manually movable member 20 is retained captive in slot 12 and adapted to be moved unidirectionally therein. Member 20 comprises a base 22 having dimensions less than the tunnel portion 14 of slot 12 but greater than the throat portion 16. Secured to base 22 and projecting upwardly through throat 16 is a shank 24 that extends substantially above surface 10a of board 10. Shank 24 is threaded to receive a manual gripping knob 26 thereon. A conventional bore in knob 26 is complimentally threaded to secure knob 26 to the shank 24.

Circumjacently disposed around shank 24 is a compression spring 28 that abuts against knob 26 at one end and against a washer 30 at its other end. Washer 30 is greater in diameter than the width of throat 16 of slot 12.

Thus, manual member 20 is movably secured to slot 12 and may be moved along slot 12 in one direction by unidirectional limiting means. Directed toward this end, the base 22 is provided with a central axial recess 32 in which a pawl 34 is pivotally mounted and spring urged downwardly into contact with the lower surface of tunnel portion 14 of slot 12. Thus, pawl 34 substantially prevents retrograde movement of member 20.

It will be noted that rotation of knob 26 on shank 24 will increase or decrease the tension of washer 30 on the surface 10a of board 10 and thereby frictionally increase or decrease the resistance to movement of the member 20 in slot 12.

Further, a small cover plate 36 covers a recessed portion of board 10 adjacent to slot 12 to permit insertion or removal of member 20 into or out of slot 12.

Thus, while there has been shown and described a single embodiment of the invention, it will be understood that modifications and changes could be made without departing from the scope of the invention as set forth in the claims. Further, the configuration of slot 12 in board 10 is merely illustrative and the particular configuration will depend upon the repetitive motion that the child requires to improve his or her ocular motor coordination.

The invention claimed is:
1. A device for improving the ocular-motor coordination of children, comprising:
   a planar board,
   a track defining an endless slot recessed in said board,
   a manually movable member captively disposed in said slot and adapted to be moved therein and having means to adjust the frictional resistance to manual movement of said member in said slot, and
   restricting means attached to said member for restricting movement of said member in a manner such that the direction of movement of said member is limited to only one direction by said restricting means.

2. A device for improving the ocular-motor coordination of children, comprising:
a substantially flat rectangular board,
means providing an endless slot recessed in one surface of said board,
a manually movable member adapted to be disposed in said slot,
retaining means disposed on the upper portion of said slot means for captively retaining said member in said slot during manual movement of said member in said slot, and
restricting means for restricting movement of said member in a manner such that the direction of movement of said member is limited to only one direction by said restricting means.

References Cited
UNITED STATES PATENTS

| | | | |
|---|---|---|---|
| 1,541,795 | 6/1925 | Cress | 35—75 |
| 2,866,433 | 12/1958 | Kallick et al. | 116—135 |

GEORGE J. MARLO, Primary Examiner

W. R. BROWNE, Assistant Examiner

U.S. Cl. X.R.

35—36